(12) United States Patent
Jung et al.

(10) Patent No.: US 12,084,101 B2
(45) Date of Patent: Sep. 10, 2024

(54) CARRIAGE

(71) Applicant: SAMSUNG ELECTRONICS CO., LTD., Suwon-si (KR)

(72) Inventors: Jun Su Jung, Suwon-si (KR); Sang Min Lee, Suwon-si (KR); Jong Hyun Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 17/562,318

(22) Filed: Dec. 27, 2021

(65) Prior Publication Data

US 2022/0119025 A1 Apr. 21, 2022

Related U.S. Application Data

(63) Continuation of application No. PCT/KR2020/007383, filed on Jun. 8, 2020.

(30) Foreign Application Priority Data

Jun. 27, 2019 (KR) .......................... 10-2019-0077187

(51) Int. Cl.
  *B62B 3/04* (2006.01)
  *B62B 3/10* (2006.01)

(52) U.S. Cl.
  CPC ................ *B62B 3/04* (2013.01); *B62B 3/108* (2013.01); *B62B 2202/56* (2013.01); *B62B 2203/07* (2013.01); *B62B 2203/21* (2013.01)

(58) Field of Classification Search
  CPC ...... B65G 1/14; B65G 1/0471; B65G 59/062; B62B 2203/07; B62B 2203/21; B62B 2202/56; B62B 3/04; B62B 3/108

(Continued)

(56) References Cited

U.S. PATENT DOCUMENTS 3,231,103 A * 1/1966 Tantlinger ................ B65G 1/14
  211/49.1
3,734,312 A * 5/1973 Hickinbotham ..... B65G 1/0442
  414/281

(Continued)

FOREIGN PATENT DOCUMENTS

DE 20306389 U1 * 9/2003 ............. A47B 73/00
DE 202004017618 U1 * 4/2005 ............... B65G 1/14

(Continued)

OTHER PUBLICATIONS

International Search Report for International Application PCT/KR2020/007383 dated Sep. 22, 2020.

(Continued)

*Primary Examiner* — Patrick D Hawn
(74) *Attorney, Agent, or Firm* — STAAS & HALSEY LLP

(57) ABSTRACT

A carriage to automatically load or unload an article. More specifically, a carriage comprising multiple fingers disposed in a pair of side frames and having a structure in which the respective adjacent fingers press each other, whereby an article is loaded or unloaded without needing to manually operate the fingers. The carriage comprises a pair of side frames formed to be disposed at both sides of the carriage in a direction along which an article is loaded into the carriage; and multiple fingers each comprising a bottom support part disposed at the bottom of the frames so as to support the loaded article, are rotatably pivoted on the pair of side frames, and generate rotational movement through pressing between the respective adjacent fingers.

13 Claims, 17 Drawing Sheets

(58) Field of Classification Search
USPC .................................. 211/41.14, 41.15, 41.16
See application file for complete search history.

(56) References Cited

U.S. PATENT DOCUMENTS

| | | | | |
|---|---|---|---|---|
| 4,572,382 | A * | 2/1986 | Niederprum | B65G 1/14 |
| | | | | 108/134 |
| 4,712,691 | A * | 12/1987 | Grill | B65G 1/14 |
| | | | | 211/49.1 |
| 5,005,712 | A * | 4/1991 | Niederprum | A47F 7/0042 |
| | | | | 53/244 |
| 5,217,121 | A * | 6/1993 | Walker | B65G 1/14 |
| | | | | 211/59.4 |
| 5,411,234 | A * | 5/1995 | Schoeller | B65G 1/14 |
| | | | | 254/89 H |
| 5,988,777 | A * | 11/1999 | Schoeller | B65G 1/14 |
| | | | | 312/190 |
| 6,223,911 | B1 * | 5/2001 | Weaver | B65G 1/14 |
| | | | | 211/150 |
| 6,536,607 | B1 * | 3/2003 | Knoll | B66F 9/07504 |
| | | | | 211/41.14 |
| 7,014,402 | B2 * | 3/2006 | Kessler | B65D 57/005 |
| | | | | 410/155 |
| 7,074,002 | B2 * | 7/2006 | Weeden | B65G 1/04 |
| | | | | 414/285 |
| 7,210,892 | B2 * | 5/2007 | Strobel | B65G 1/14 |
| | | | | 414/794.9 |
| 7,237,993 | B2 * | 7/2007 | Farley | B65D 19/44 |
| | | | | 410/43 |
| 7,264,126 | B1 * | 9/2007 | Bergeron | B65G 49/062 |
| | | | | 211/41.15 |
| 7,878,343 | B2 * | 2/2011 | Strobel | B65G 1/14 |
| | | | | 211/150 |
| 8,789,710 | B1 * | 7/2014 | Moore | B62B 1/20 |
| | | | | 211/41.14 |
| 10,059,521 | B2 * | 8/2018 | Swoboda | B65G 59/101 |
| 10,280,002 | B2 * | 5/2019 | Giachero | B65G 1/14 |
| 10,829,318 | B2 * | 11/2020 | Kreft | A47F 7/0014 |
| 11,111,078 | B2 * | 9/2021 | Laible | B65G 1/14 |
| 11,235,927 | B2 * | 2/2022 | Hognaland | B65G 1/1378 |
| 11,678,743 | B2 * | 6/2023 | Cavelius | A47B 87/0261 |
| | | | | 211/126.6 |
| 2004/0238465 | A1 * | 12/2004 | Mercure | A47F 7/14 |
| | | | | 211/41.1 |
| 2020/0095073 | A1 * | 3/2020 | Kreft | B65G 1/14 |

FOREIGN PATENT DOCUMENTS

| | | | | |
|---|---|---|---|---|
| DE | 102009046063 | A1 * | 5/2011 | ................ B65G 1/14 |
| DE | 102013009340 | A1 * | 12/2014 | ........... B65G 1/0471 |
| EP | 0808783 | A1 * | 11/1997 | ................ B65G 1/14 |
| KR | 10-2004-0106689 | A | 12/2004 | |
| KR | 10-2006-0011508 | A | 2/2006 | |
| KR | 10-0675307 | B1 | 1/2007 | |
| KR | 10-1031190 | B1 | 4/2011 | |
| KR | 10-2013-0087120 | A | 8/2013 | |
| KR | 20-0478435 | Y1 | 10/2015 | |
| KR | 10-2017-0017020 | A | 2/2017 | |
| KR | 10-1946955 | B1 | 2/2019 | |
| WO | WO 02/096767 | A2 | 12/2002 | |
| WO | WO-2014104052 | A1 * | 7/2014 | ............. B21D 43/22 |

OTHER PUBLICATIONS

Office Action dated Jun. 20, 2024 for corresponding Korean patent application No. 10-2019-0077187.

* cited by examiner

CARRIAGE

CROSS REFERENCE TO THE RELATED APPLICATION

This application is a continuation application, under 35 U.S.C. § 111(a), of international application No. PCT/KR2020/007383, filed Jun. 8, 2020, which claims priority to Korean patent application No. 10-2019-0077187, filed Jun. 27, 2019, the entire disclosures of all of which are herein incorporated by reference as a part of this application.

BACKGROUND

Field

The present disclosure relates to a carriage for loading and unloading an article.

Description of the Related Art

Display apparatuses are devices that display a screen and include monitors and televisions. Display apparatuses may be classified into self-emissive display panels such as organic light-emitting diodes (OLEDs) and light-receiving/emitting display panels such as liquid crystal displays (LCDs).

In a process of manufacturing such display apparatuses, a carriage for loading or unloading display panels may be used.

In the related art, a process of loading and unloading articles was partially conducted by humans by manually operating a fixing pin. Accordingly, workloads and working hours are excessive.

SUMMARY

One aspect of the present disclosure provides a carriage including: a pair of side frames formed to be disposed at both sides of the carriage which includes a receiving part where an article is to be loaded into a receiving part; a base to support the article; and multiple fingers rotatably installed at the pair of side frames and arranged along a direction where the article is to be loaded, wherein each of the multiple fingers includes: a support part to rotate in contact with the article while the article is loaded into the carriage or unloaded out of the carriage; and a pressing part configured to press and rotate an adjacent finger as the support part rotates.

Each of the multiple fingers may further include a rotating body constituting a rotation center.

Each finger may further include a shaft rotatably supporting the rotating body, and the rotating body has a shaft insertion hole into which the shaft is inserted.

The support part may be formed to extend from one side of the rotating body toward the receiving part, and the pressing part may be formed to extend from the other side of the rotating body.

An extending direction of the support part may form an obtuse angle with an extending direction of the pressing part.

The pressing part may include a pressing arm formed to extend from the rotating body and a stopper formed to protrude from the pressing arm to be interfered with by a side frame among the pair of side frames as the pressing part rotates.

The multiple fingers may include a first finger and a second finger disposed in front of the first finger in a loading direction of the article, wherein a support part of the first finger is formed to be pressed by the article while the article is loaded to the carriage.

As the support part of the first finger rotates, a pressing part of the first finger may press a pressing part of the second finger, and a support part of the second finger may rotate to a position to be pressed by a next article to be loaded to the carriage.

The support part of each finger may be located at a first position with no interfere with the article loaded into the receiving part, at a second position to be inclined and pressed by the article, and at a third position to support the loaded article.

The multiple fingers may include a first finger and a second finger disposed in front of the first finger in a loading direction of the article, wherein as the article is loaded, a support part of the second finger is located at the first position and a support part of the first finger is pressed by the article being loaded to move from the second position to the third position.

As the support part of the first finger rotates from the second position to the third position, the pressing part of the first finger may press the pressing part of the second finger to move the support part of the second finger from the first position to the second position.

The multiple fingers may include a first finger and a second finger disposed behind the first finger in an unloading direction of the article, wherein as the article is unloaded, a support part of the second finger is located at the third position and a support part of the first finger is pressed by the article being unloaded to move from the second position to the first position.

As the support part of the first finger rotates from the second position to the first position, the pressing part of the first finger may press the pressing part of the second finger to move the support part of the second finger from the third position to the second position.

The pair of side frames may include a first side frame and a second side frame movable with respect to the first side frame.

The distance between the shafts may be adjusted in the range of 20 mm to 40 mm.

The base may include a support surface to support the article, and the support surface may be inclined downward in a loading direction of the article.

The support surface may be inclined downward such that an angle between the loading direction of the article and the support surface is in the range of 5° to 20°.

The carriage may further include a non-slip part disposed between the base and a contact surface of the article toward the receiving part.

One aspect of the present disclosure provides a carriage including a pair of side frames formed to be disposed at both sides of the carriage which includes a receiving part where an article is to be loaded; a base to support the article; and multiple fingers rotatably installed at the pair of side frames and arranged along a direction where the article is to be loaded, wherein the multiple fingers are arranged to press an adjacent finger by rotation.

The base includes a support surface to support the article, and the support surface may be configured to be inclined downward in a loading direction of the article.

BRIEF DESCRIPTION OF DRAWINGS

The above and/or other aspects of the disclosure will be more apparent by describing certain embodiments of the disclosure with reference to the accompanying drawings, in which.

DETAILED DESCRIPTION

Figure 1:
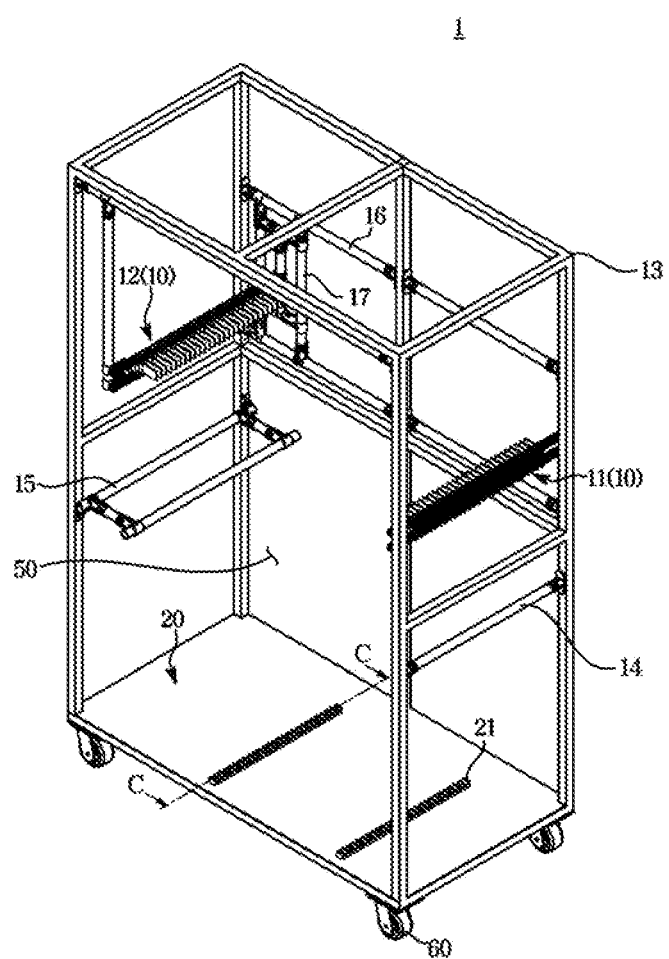
FIG. 1 is a perspective view illustrating a carriage according to an embodiment of the present disclosure.

Reference will now be made in detail to the embodiments of the present disclosure, examples of which are illustrated in the accompanying drawings. The embodiments described in the specification and shown in the drawings are only illustrative and are not intended to represent all aspects of the invention, such that various modifications may be made without departing from the spirit of the invention.

In the drawings, like reference numerals denote like elements or components having substantially same functions.

The terms used in the present specification are merely used to describe particular embodiments, and are not intended to limit the present disclosure. An expression used in the singular encompasses the expression of the plural unless it has a clearly different meaning in the context. In the present specification, it is to be understood that the terms such as "including" or "having", etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

Hereinafter, embodiments of the present disclosure will be described in detail with reference to the accompanying drawings.

The present disclosure is directed to providing a carriage for effectively and quickly loading and unloading articles.

The present disclosure is directed to providing a carriage including fingers that support articles during loading and unloading processes wherein operation of each finger is effectively improved.

A carriage for loading and unloading articles by pressing adjacent fingers via rotational movement of the adjacent fingers may be provided.

When loading of one article is completed by a pair of fingers, a pair of adjacent fingers may be located at positions for loading of a next article. A carriage capable of reducing working hours via effective and continuous loading may be provided.

When unloading of one article out of the carriage is completed by pressing a pair of fingers, a pair of adjacent fingers may be located at positions for unloading of a next article. A carriage capable of reducing working hours via effective and continuous unloading may be provided.

Although a flat display device will be described as an article P to be loaded, the embodiment may also be applied to a curved display device or a bendable or flexible display device whose state is variable between a curved state and a flat state.

Also, as used herein, the term 'front' is defined based on a carriage 1 and a receiving part 50 illustrated in FIG. 1. Accordingly, the 'upper side' and 'lower side' indicate upper and lower sides of the carriage 1 illustrate in FIG. 1 and the 'both sides' and 'sides' indicate a direction of left and right sides of the carriage 1 illustrated in FIG. 1.

Figure 2:
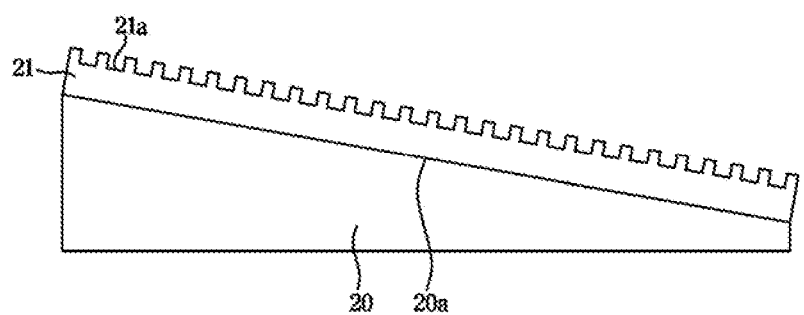
FIG. 2 is a cross-sectional view of a base of a carriage according to an embodiment of the present disclosure.
Figure 3:
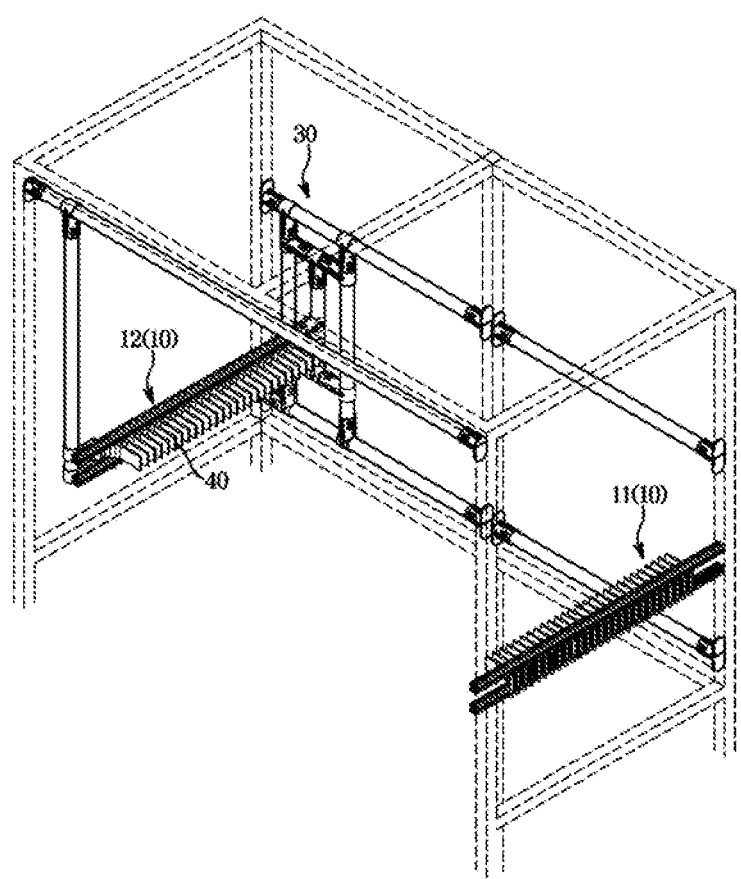
FIG. 3 is a perspective view illustrating a slider and a pair of side frames of a carriage according to an embodiment of the present disclosure.

Hereinafter, a carriage according to an embodiment will be described with reference to FIGS. 1 to 3. As shown in FIGS. 1 to 3, a carriage 1 may include a pair of side frames 10, a base 20, a receiving part 50, a slider 30 configured to adjust a width of the pair of side frames 10, a non-slip part 21, and wheels 60.

As illustrated in FIG. 1, the carriage 1 may have a structure in which linear frames 13 are disposed at edges of a rectangular parallelepiped shape. In addition, the structure further includes a reinforcement frame 14 connecting the linear frames 13 of the edges in addition to the edges to improve durability of the carriage 1. The linear frame 13 may be coupled to the reinforcement frame 14 of the carriage 1 by fastening a setscrew.

As illustrated in FIG. 1, in addition to the above-described linear frame 13 and reinforcement frame 14, the carriage 1 may further include an auxiliary frame 15 below the side frames, which will be described later, to additionally support articles P for more stable loading upon completion of loading of a desired number of articles P. Although the auxiliary frame 15 disposed below the side frame, which will be described later, is shown in FIG. 1, arrangement of the auxiliary frame 15 is not limited thereto, and the auxiliary frame 15 may be disposed to have various shapes at various positions as long as the auxiliary frame 15 does not interfere with the loading of the article P.

As illustrated in FIG. 1, a receiving part 50 may be formed inside the carriage 1. A size of the receiving part 50 may vary according to a size of the article P to be loaded thereinto without limitation.

As illustrated in FIG. 1, the base 20 may be disposed at the bottom of the carriage 1, i.e., the bottom of the receiving part 50. As illustrated in FIG. 1, the base 20 may be configured in the form of a plate covering the entire area of the bottom of the carriage 1. Also, the embodiment is not limited thereto, and the base 20 may consist of only the linear frames 13.

Referring to a cross-sectional view of the base 20 of FIG. 2, the base 20 may have a support surface 20a to support the article P. The support surface 20a may be disposed to be inclined downward along a loading direction of the article P. Specifically, the support surface 20a may be inclined such that an angle 20b between the loading direction of the article P and the support surface 20a supporting the article and formed on the base 20 is in the range of 5° to 20°. By the inclined base 20, weight of the article P may be used, enabling more stable loading and movement.

A non-slip part 21 to prevent the article P from sliding or being damaged may be disposed on the support surface 20a disposed between the base 20 and the loaded article P. The non-slip part 21 may be disposed on the base 20 as shown in FIG. 1. Alternatively, the non-slip part 21 may have a rail shape with consecutive recesses. Referring to FIG. 2, although an extended length of the non-slip part 21 is illustrated to be the same as a width of the base 20, the extended length may vary according to capacity for the article P. A contact surface 21a formed in direct contact with the article P may be included on the non-slip part 21. However, the embodiment is not limited thereto, the non-slip part 21 may have various structures and be formed of various materials capable of fixing the article P between the article P and the contact surface 21a using frictional force, or the like or the article P may be supported only by the base 20 without disposing the non-slip part 21.

The slider 30 may have a structure to which at least one side frame 11 or 12 of the pair of side frames 10, which will be described later, is coupled.

In the manufacturing process, display panels with various sizes may be manufactured. In this case, when carriages respectively prepared to load articles having various sizes are applied to the process, it is difficult to manage the loading carriages due to volumes thereof and manufacturing costs of the articles increase. Therefore, by adjusting a width of the pair of side frames 10 using the slider 30, articles P with various sizes may be loaded on the carriage and efficiency of the process may be increased and manufacturing costs of products may be reduced.

Specifically, the slider 30 may include a slide guide frame 16. In addition, the slider 30 may include a moving frame 17 configured to slide on the slide guide frame 16. At least one side frame 11 or 12 of the pair of side frames 10 may be configured to slide together with the moving frame 17 in a state of being coupled to the moving frame 17. Sliding may occur in both directions. That is, at least one side frame 12 coupled to the slider 30 may be configured to slide toward or away from the other side frame 11. As such, articles having various sizes may be loaded on the carriage by adjusting the width of the pair of side frames 10 using the slider 30.

However, in addition to the structure of the slider 30, any element capable of adjusting the width of the pair of side frames 10 may also be applied to the carriage according to an embodiment.

Hereinafter, a pair of side frames 10 and multiple fingers 40 will be described with reference to FIGS. 4 and 5.

A pair of side frames 10 may include side frames 11 and 12 located at opposite sides of the receiving part 50 in the carriage 1. Although only a pair of side frames 10 may be disposed in the carriage 1, a plurality of pairs of side frames may also be disposed in the carriage 1 according to in-process production capacity and storage capacity.

Figure 5:
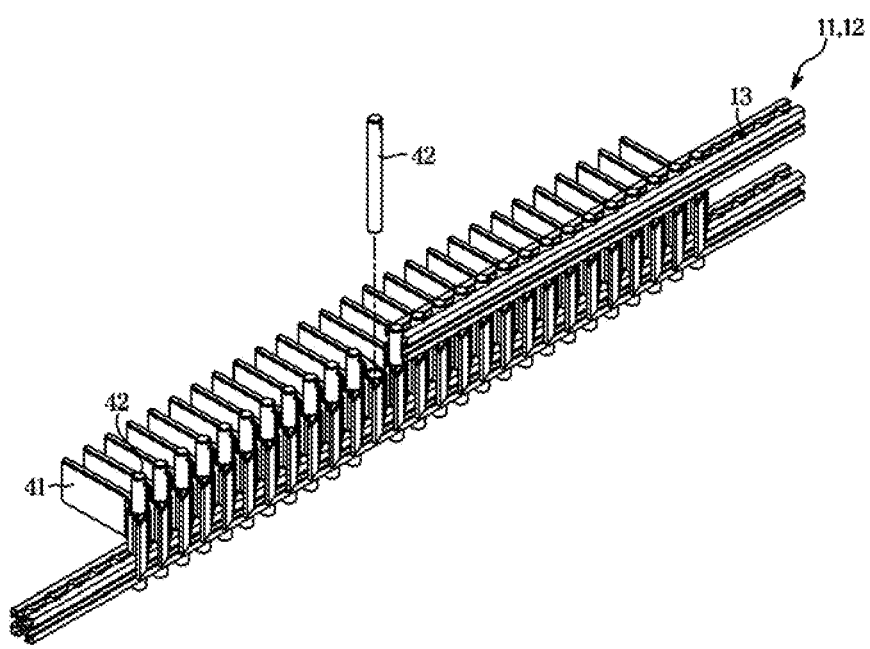
FIG. 5 is a perspective view illustrating one of the pair of side frames and multiple fingers of a carriage according to an embodiment of the present disclosure.

As shown in FIG. 5, each of the side frames 11 and 12 may include an upper frame and a lower frame respectively disposed on upper and lower sides of the multiple fingers 40. However, the structure of the side frames 11 and 12 is not limited thereto, and the upper and lower frames may be configured as one frame as long as the multiple frames 40 are stably supported thereby at regular intervals. One side frame 11 or 12 of the pair of side frames 10 may be arranged to be fixed to the linear frame 13 disposed on one of both sides of the carriage 1. In this regard, the linear frame 13 formed on the side of the carriage 1 may be coupled to the side frame 11 or 12 by fastening a setscrew. Alternatively, they may be mutually joined by welding.

Figure 4:
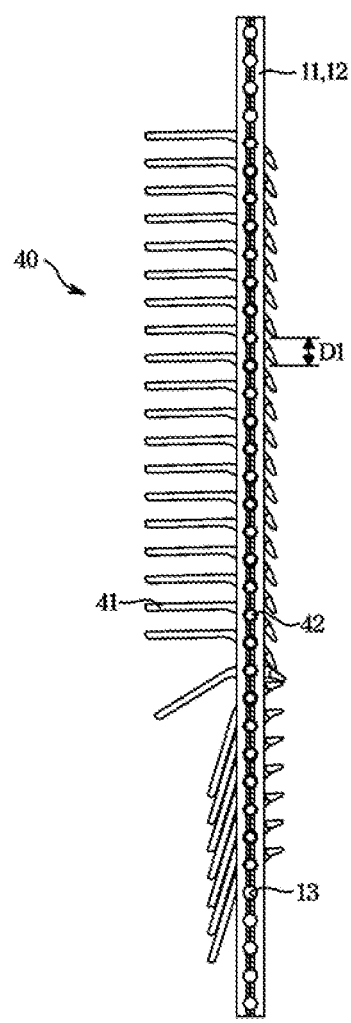
FIG. 4 is a plan view illustrating the side frame and multiple fingers of FIG. 3.
Figure 6:
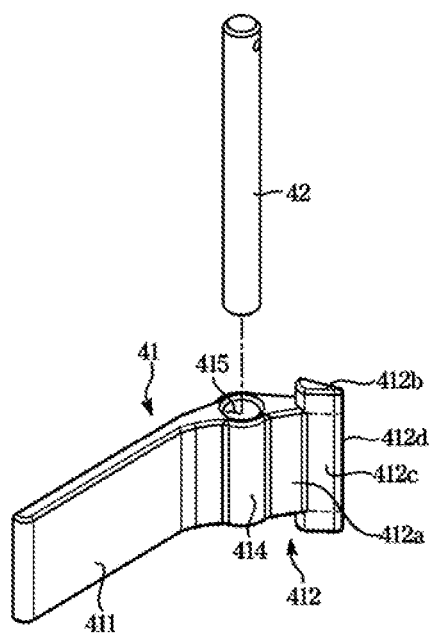
FIG. 6 is a perspective view illustrating a finger and a shaft of a carriage according to an embodiment of the present disclosure.

As shown in FIGS. 4 to 6, the multiple fingers 40 may be disposed at the side frames 11 and 12. In this regard, the multiple fingers 40 may be aligned in an extending direction of the side frames 11 and 12. Each of the multiple fingers 40 may include a rotating body 414 to rotate about the side frame 11 or 12. The rotating body 414 may be configured to rotate about a rotation center of each finger 41. According to an embodiment, rotational movement of the rotating body 414 may be implemented by a shaft 42. That is, among the multiple fingers 40, each finger 41 may be configured to rotationally move by a cylindrical shaft 42 simultaneously being supported by the side frame 11 or 12. A shaft fixing hole 13 may be formed in the side frames 11 and 12 to fix the shaft to the side frames 11 and 12.

The number of the multiple fingers 40 arranged at the side frames 11 and 12 may vary according to in-process production rates and types and sizes of articles. In this case, the side frames 11 and 12 included in the pair of side frames 10 may include the same number of fingers. The number of the shaft fixing holes 13 formed in the side frames 11 and 12 may correspond to the number of the multiple frames 40. However, the embodiment is not limited thereto, and the number of the shaft fixing holes 13 formed in the side frames 11 and 12 may be greater than the number of the multiple frames 40.

The shaft fixing holes 13 may be formed in the side frames 11 and 12 in extending directions of the side frames 11 and 12 to correspond to the multiple frames 40 as shown in FIGS. 4 and 5. In this case, distances D between every two adjacent shafts 42 may be identical to each other. The distance D may be adjusted in the range of 20 mm to 40 mm.

The shafts 42 may be provided in a number corresponding to the number of the multiple fingers 40. After passing through the shaft fixing hole 13 formed in the side frame 11 or 12 and a shaft insertion hole 415, which will be described later, formed in the finger 41, the shaft 42 may be fixed to the side frame 11 or 12. In this case, used herein is a fixing method of using a structure configured to fix the shaft 42 to the side frame 11 or 12 by inserting a pin into a hole formed at opposite ends of the shaft 42 to penetrate sides of the shaft 42 in a diameter direction of the shaft 42. However, the fixing method is not limited to this structure and the fixing may be achieved by a screw structure or a fastening structure such as a bolt and a nut.

Hereinafter, the finger 41 will be described with reference to FIGS. 6 to 9.

The finger 41 may include a support part 411, a pressing part 412, and a rotating body 414 as shown in FIGS. 6 to 9.

The rotating body 414 of the finger 41 may have a cylindrical shape with a shaft insertion hole 415 formed to allow the above-described shaft to be inserted thereinto and penetrate at the center. The overall shape of the rotating body 414 is not limited to the cylindrical shape as long as rotation movement of the finger 41 is possible after the shaft 42 is inserted thereinto. However, in an embodiment, the rotating body 414 having a cylindrical shape as the overall shape will be described.

The support part 411 of the finger 41 may be formed to extend from one portion of the outer peripheral surface of the rotating body 414 and face the receiving part 50. Specifically, an extending direction X thereof may be formed to be parallel to a surface of the article in contact with the finger 41 in a state where the article is finally seated on the finger 41 and to face the inside of the carriage 1. A length of the support part 411 in the extending direction in not necessarily set to a given value but may be arbitrarily set because the width may be adjusted by the slider 30. However, the length may be in the range of 60 mm to 120 mm in consideration of the distance D between the shaft fixing holes 13.

The pressing part 412 of the finger 41 may be formed to extend from another portion of the outer peripheral surface which is different from that of the outer peripheral surface from which the above-described support part extends. Referring to a plan view of the finger 41 of FIG. 8, the portions of the outer peripheral surface from which the support part 411 and the pressing part 412 respectively extend may be arranged to face each other at opposite ends of a diameter of the shaft insertion hole 415. However, the portions of the outer peripheral surface of the rotating body 414 from which the pressing part 412 and the support part 411 extend are not limited to the above-described arrangement.

Next, an extending direction Y of the pressing part 412 will be described based on the arrangement of the finger 41 with reference to FIGS. 6 to 9, 11, and 12. A rotation direction will be described with respect to the side frame 11 of FIGS. 11 and 12. The pressing part 412 of the finger 41a may include a pressing surface 412c to press an adjacent finger 41b when rotating in an R1 direction, a pressing surface 412d to press an adjacent finger 41 when rotating in an R2 direction, and a stopper 412b. The extending direction Y of the pressing part 412 may be defined by using a vector of the extending direction X of the above-described support part 411 and a vector starting from the center of the shaft insertion hole 415 toward the end of the pressing part 412. First, based on the state where the article is finally seated on the support part 411, the vector of the extending direction X of the support part 411 may form an obtuse angle with the vector starting from the center of the shaft insertion hole 415 toward the end of the pressing part 412. That is, the extending direction Y of the pressing part 412 may be formed toward the outside of the carriage 1 and the front of the carriage 1. Since the pressing part 412 extends in the extending direction Y as described above, the pressing surface 412c presses a pressing surface 412d of an adjacent finger 41b when rotating in the R1 direction, and the pressing surface 412d presses a pressing surface 412c of an adjacent finger 41b when rotating in the R2 direction.

Figure 7:
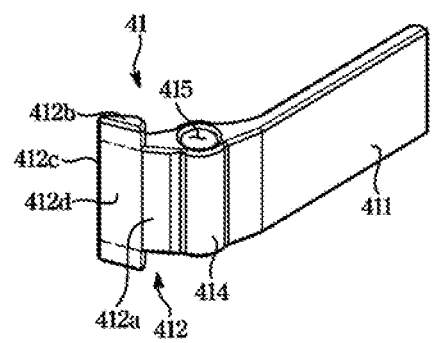
FIG. 7 is a perspective view illustrating a rear surface of the finger of FIG. 6 according to the present disclosure.

Then, the stopper 412b will be described with reference to FIGS. 6 to 8. The rotation direction will be described with respect to the side frame 11 of FIGS. 11 and 12.

As shown in FIGS. 5 to 8, the finger 41 may include a pressing arm 412a having the pressing surfaces 412c and 412d and the stopper 412b. The stopper 412b may protrude from ends of the pressing arm 412a where the pressing surfaces 412c and 412d are located toward a rotation axis of the rotating body 414. When the finger 41 rotates in the R1 direction and the article is located on the support part 411 in a final seated state, the stopper 412b is brought into contact with the side frame 11 to limit rotation in the R1 direction. On the contrary, when the finger 41 rotates in the R2 direction and the article is in a state to be easily unloaded, the stopper 412b is brought into contact with the side frame 11 to limit rotation in the R2 direction.

Next, operation of the multiple frames 40 during loading or unloading will be described with reference to FIGS. 8, 11, and 12. The rotation direction will be described with respect to the side frame 11 of FIGS. 11 and 12.

Figure 8:
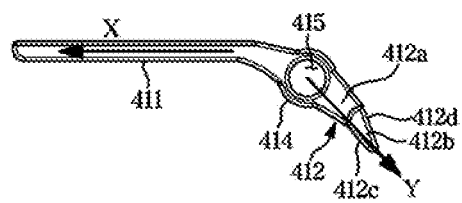
FIG. 8 is a plan view of the finger shown in FIG. 6 according to the present disclosure.
Figure 9:
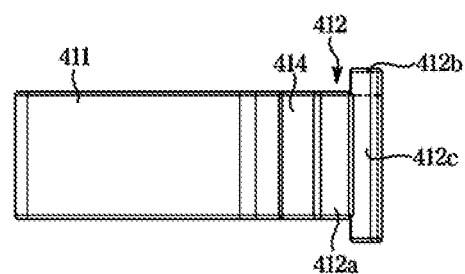
FIG. 9 is a front view of the finger shown in FIG. 6 according to the present disclosure.
Figure 13:
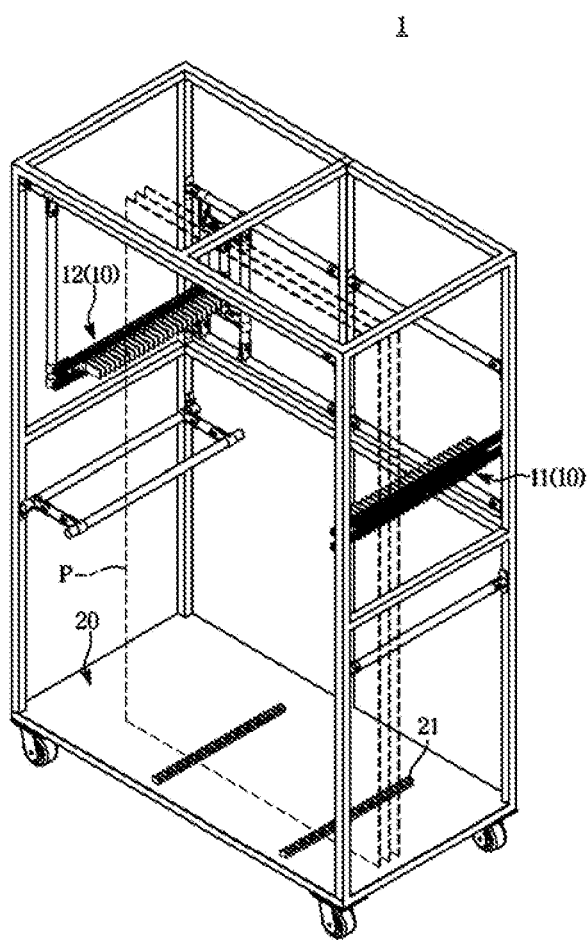
FIG. 13 is a perspective view of a carriage in which an article is loaded according to an embodiment of the present disclosure.

Referring to FIGS. 8 and 11, during loading, an article P may be loaded into the carriage 1 in a direction of arrow A. In this case, a pair of fingers 41 first touched by the article P being loaded may be located such that the end of the support part 411 faces forward compared to other pairs of fingers parallel to surfaces of articles P that are already seated after being loaded. The article P being loaded arrives at the finally seated state while pressing the pair of fingers 41a, which the article P is first brought into contact with. That is, the article P being loaded may rotate the pair of fingers 41a first touched by the article P in the R1 direction. Then, the stopper 412b is brought into contact with the side frame 11 to prevent the rotation so that the article P arrives at the finally seated state. In addition, the bottom of the article P may be supported by the non-slip part 21. Therefore, the article P may be loaded in the carriage 1 while maintaining an upright state as shown in FIG. 13.

Hereinafter, a series of motions of the multiple frames 40 during the loading process will be described. The rotation direction will be described with respect to the side frame 11 of FIGS. 11 and 12. Referring to FIGS. 8 to 11, the article P being loaded presses a pair of fingers 41a first touched by the article P to rotate the fingers 41a of the side frame 11 in the R1 direction. In this case, pressing surfaces 412c of the pair of fingers 41a first touched thereby may press pressing surfaces 412d of a pair of adjacent fingers 41b located in front thereof. Subsequently, when the pair of fingers 41a pressed by the article P arrive at the finally seated states, the pair of pressed adjacent fingers 41b may be located to face forward unlike other pairs of fingers parallel to surfaces of articles P that are already seated after being loaded. As this process occurs repeatedly, a carriage capable of loading articles P without manually operating the fingers 41 may be provided.

Referring to FIGS. 8 and 12, during unloading, the article P may be unloaded out of the carriage 1 in a direction of arrow B. In this case, a pair of fingers 41a first touched by the article P being unloaded may be located such that the end of the support part 411 faces forward compared to other pairs of fingers parallel to surfaces of articles P that are already seated after being loaded. The article P being unloaded presses the pair of fingers 41a first touched thereby and moves forward to be unloaded. That is, the article P being unloaded may press and rotate the pair of fingers 41a in the R2 direction. Subsequently, the stopper 412b is brought into contact with the side frame 11 to limit the rotation.

Hereinafter, a series of motions of the multiple frames 40 during the unloading process will be described. The rotation direction will be described with respect to the side frame 11 of FIGS. 11 and 12. Referring to FIGS. 8 to 12, the article P being unloaded presses a pair of fingers 41a first touched by the article P to rotate the fingers 41a in the R2 direction.

In this case, pressing surfaces 412d of the pair of fingers 41a first touched thereby may press pressing surfaces 412c of a pair of adjacent fingers 41b located behind. Subsequently, when the pair of fingers 41a first touched by the article P stop rotation, the pair of pressed adjacent fingers 41b may be located to face forward unlike other pairs of fingers parallel to surfaces of articles P that are already seated after being loaded. As this process occurs repeatedly, a carriage capable of unloading articles P without manually operating the fingers 41 may be provided.

Hereinafter, a series of motions of the multiple frames 40 will be described with reference to FIGS. 10 to 12 in a different way from those described above.

Figure 10:
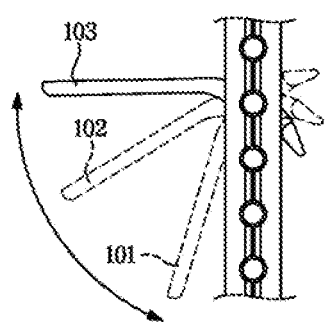
FIG. 10 is a plan view illustrating three positions of a finger with respect to a side frame in a carriage according to an embodiment of the present disclosure.

Referring to FIG. 10, the support part of the finger 41 may be located at a first position 101 not to interfere with the article P loaded into or unloaded out of the receiving part 50, at a second position 102 to be inclined and pressed by the article P, and at a third position 103 to support the loaded article P.

Figure 11A:
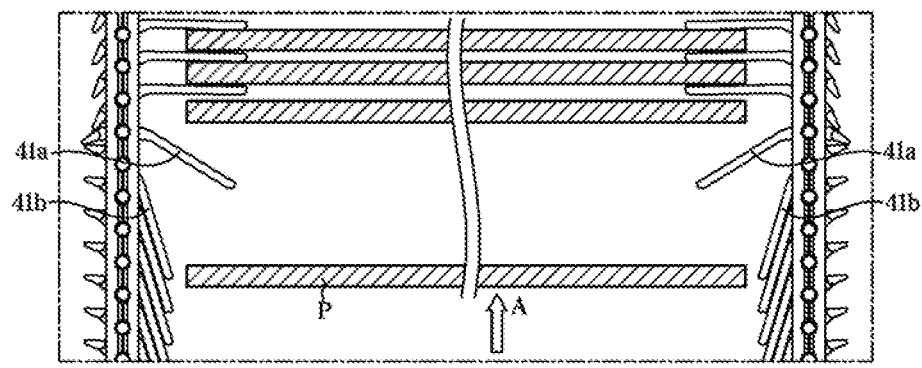
FIGS. 11A and 11B are diagrams for describing an operation of loading an article into a carriage according to an embodiment of the present disclosure.
Figure 11B:
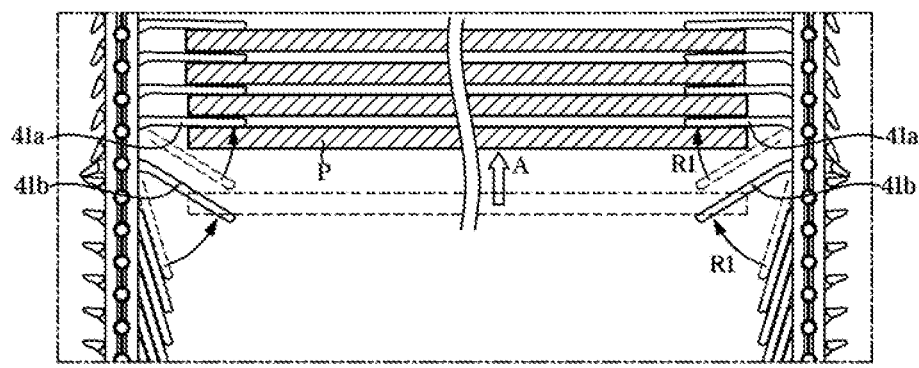

Referring to FIGS. 10 and 11A, the multiple fingers 41 may include a first finger 41a and a second finger 41b disposed in front of the first finger 41a in a loading direction A of the article P. When the article P is loaded, the support part 411 of the second finger 41b is disposed at the first position 101, and the support part 411 of the first finger 41a is pressed by the article P to move from the second position 102 to the third position 103. Referring to FIGS. 10 and 11B, when the support part 411 of the first finger 41a rotates from the second position 102 to the third position 103, the pressing part 412 of the first finger 41a presses the pressing part 412 of the second finger 41b to move the support part 411 of the second finger 41b from the first position 101 to the second position 102. As this process occurs repeatedly, a carriage capable of loading articles P without manually operating the fingers 41 may be provided.

Figure 12A:
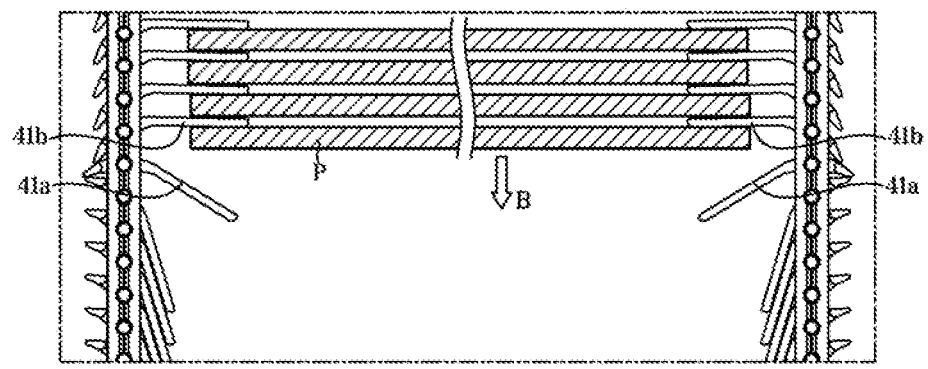
FIGS. 12A and 12B are diagrams for describing an operation of unloading an article out of a carriage according to an embodiment of the present disclosure.
Figure 12B:
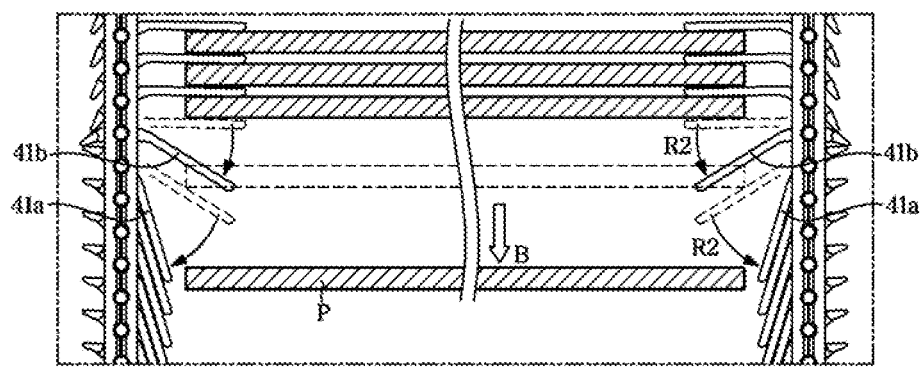

Referring to FIGS. 10 and 12A, the multiple fingers 41 may include a first finger 41a and a second finger 41b disposed behind the first finger 41a in an unloading direction B of the article P. When the article P is unloaded, the support part 411 of the second finger 41b is disposed at the third position 103, and the support part 411 of the first finger 41a is pressed by the article P being unloaded to move from the second position 102 to the first position 101. Referring to FIGS. 10 and 12B, when the support part 411 of the first finger 41a rotates from the second position 102 to the first position 101, the pressing part 412 of the first finger 41a presses the pressing part 412 of the second finger 41b to move the support part 411 of the second finger 41b from the third position 103 to the second position 102. As this process occurs repeatedly, a carriage capable of unloading articles P without manually operating the fingers 41 may be provided.

In addition, in the case where the rotation of the finger 41 is terminated due to friction generated on the contact surface between the inner peripheral surface of the shaft insertion hole 415 and the shaft, the position of the finger 41 may be maintained at the position where the rotation is terminated.

Figure 14:
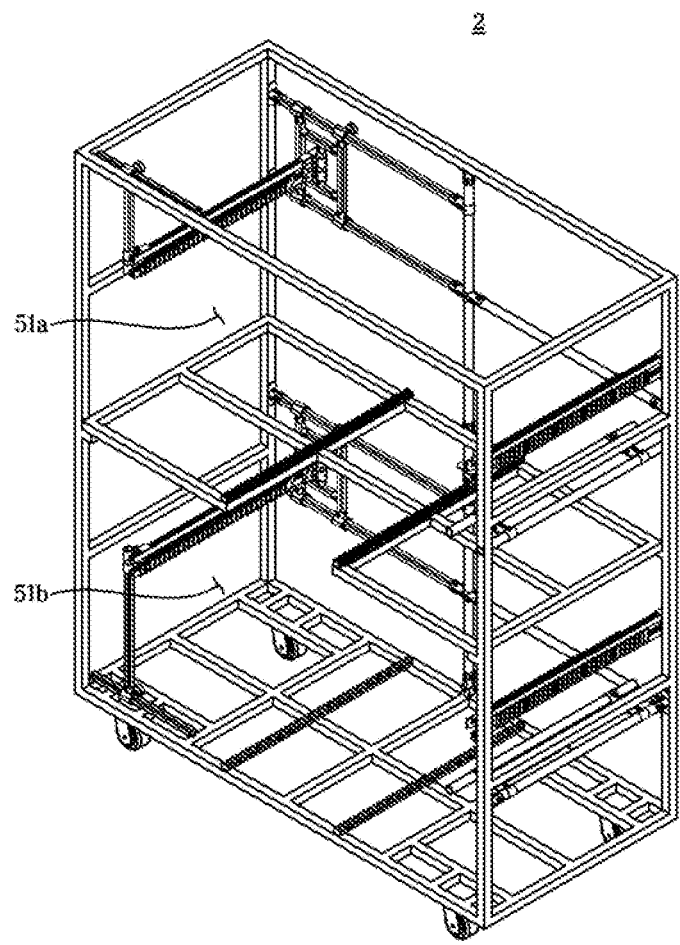
FIG. 14 is a perspective view of a carriage according to another embodiment of the present disclosure.

FIG. 14 shows a carriage 2 according to another embodiment of the present disclosure. Unlike the single-stage carriage 1 describe above, a carriage 2 including two stages 51a and 51b may be configured according to size and number of the articles. Also, a multi-stage carriage may also be used.

Figure 15:
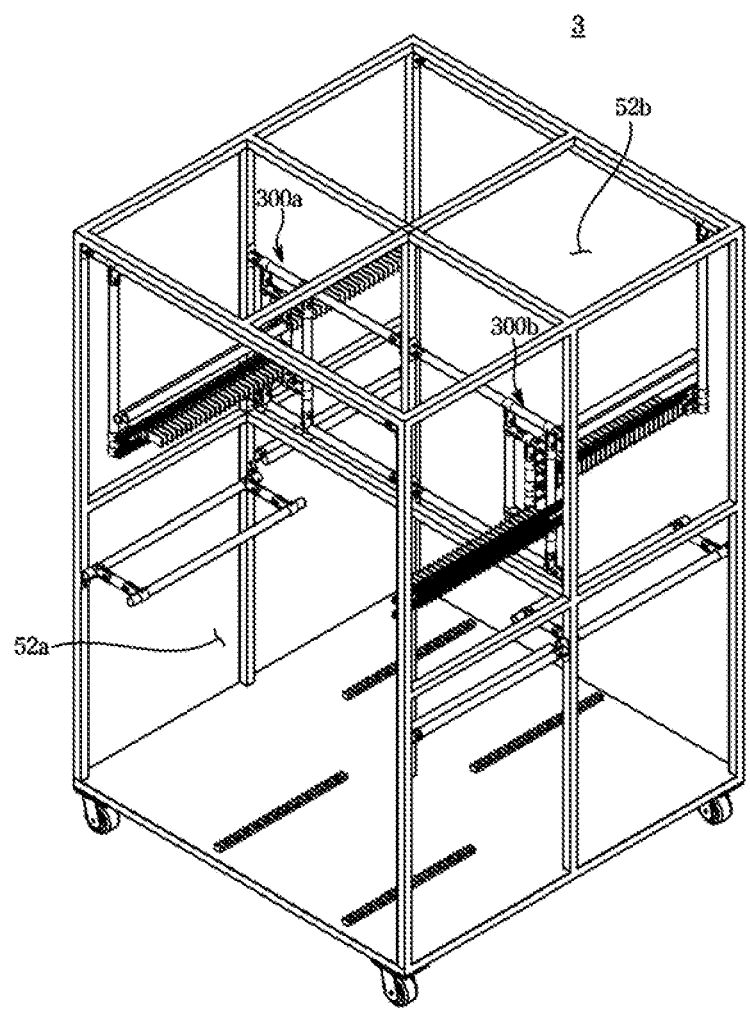
FIG. 15 is a perspective view of a carriage according to another embodiment of the present disclosure.

FIG. 15 shows a carriage 3 according to another embodiment of the present disclosure. Unlike the single-stage carriage 1 describe above, the carriage 3 allows loading and unloading of articles through front and rear sides. According to the embodiment, sliders 300a and 300b may be arranged so as not to interfere with each other for efficient arrangement thereof. By using the carriage 3, an effect on easily unloading an article loaded in a deep place may be achieved.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A carriage comprising:
   a pair of side frames formed to be disposed at both sides of the carriage which includes a receiving part where an article is to be loaded;
   a base to support the article; and
   multiple fingers rotatably installed at the pair of side frames and arranged along a direction where the article is to be loaded,
   wherein each of the multiple fingers comprises:
      a support part to rotate in contact with the article while the article is loaded into the carriage or unloaded out of the carriage; and
      a pressing part configured to press and rotate an adjacent finger as the support part rotates,
   wherein each of the multiple fingers further comprises a rotating body constituting a rotation center,
   wherein the pressing part comprises a pressing arm formed to extend from the rotating body and a stopper formed to protrude from the pressing arm and configured to limit rotation of each finger in a direction in which the article is loaded, due to interference with a side frame among the pair of side frames when the article arrives at a finally seated state.

2. The carriage of claim 1, wherein each finger further comprises a shaft rotatably supporting the rotating body, and the rotating body has a shaft insertion hole into which the shaft is inserted.

3. The carriage of claim 1, wherein the support part is formed to extend from one side of the rotating body toward the receiving part, and the pressing part is formed to extend from another side of the rotating body.

4. The carriage of claim 3, wherein an extending direction of the support part forms an obtuse angle with an extending direction of the pressing part.

5. The carriage of claim 1, wherein the multiple fingers comprise a first finger and a second finger disposed in front of the first finger in a loading direction of the article,
   wherein a support part of the first finger is formed to be pressed by the article while the article is loaded to the carriage.

6. The carriage of claim 5, wherein as the support part of the first finger rotates, a pressing part of the first finger presses a pressing part of the second finger, and a support part of the second finger rotates to a position to be pressed by a next article to be loaded to the carriage.

7. The carriage of claim 1, wherein the support part of each finger is located at a first position with no interfere with the article loaded into the receiving part, at a second position to be inclined and pressed by the article, and at a third position to support the loaded article.

8. The carriage of claim 7, wherein the multiple fingers comprise a first finger and a second finger disposed in front of the first finger in a loading direction of the article, wherein as the article is loaded, a support part of the second finger is located at the first position and a support part of the first finger is pressed by the article being loaded to move from the second position to the third position.

9. The carriage of claim 8, wherein as the support part of the first finger rotates from the second position to the third position, the pressing part of the first finger presses the pressing part of the second finger to move the support part of the second finger from the first position to the second position.

10. The carriage of claim 7, wherein the multiple fingers comprise a first finger and a second finger disposed behind the first finger in an unloading direction of the article,
   wherein as the article is unloaded, a support part of the second finger is located at the third position and a support part of the first finger is pressed by the article being unloaded to move from the second position to the first position.

11. The carriage of claim 9, wherein as the support part of the first finger rotates from the second position to the first position, the pressing part of the first finger presses the pressing part of the second finger to move the support part of the second finger from the third position to the second position.

12. The carriage of claim 1, wherein the pair of side frames comprise a first side frame and a second side frame movable with respect to the first side frame,
   the base comprises a support surface to support the article, and
   the support surface is inclined downward in a loading direction of the article.

13. The carriage of claim 1, further comprising a non-slip part disposed between the base and a contact surface of the article.

\* \* \* \* \*